United States Patent [19]
Ying et al.

[11] 4,057,849
[45] Nov. 8, 1977

[54] TEXT EDITING AND DISPLAY SYSTEM

[75] Inventors: Charles W. Ying, Andover; Richard Ying, Brookline, both of Mass.

[73] Assignee: Atex, Incorporated, Bedford, Mass.

[21] Appl. No.: 717,000

[22] Filed: Aug. 23, 1976

Related U.S. Application Data

[63] Continuation of Ser. No. 508,359, Sept. 23, 1974, abandoned.

[51] Int. Cl.$^2$ ............................................. G11B 27/02
[52] U.S. Cl. ................................................... 364/200
[58] Field of Search ....................................... 364/200

[56] References Cited

U.S. PATENT DOCUMENTS

| | | | |
|---|---|---|---|
| 3,764,986 | 10/1973 | Spademan et al. | 340/172.5 |
| 3,980,994 | 9/1976 | Ying et al. | 340/172.5 |

Primary Examiner—Raulfe B. Zache
Assistant Examiner—C. T. Bartz
Attorney, Agent, or Firm—Cesari and McKenna

[57] ABSTRACT

A text-editing and display system for editing and displaying natural language text, the system including a display controller, a central processing unit, a memory unit, a CRT raster scan display unit, and an input unit such as a teletypewriter keyboard. Text characters defining words are stored close-packed and in sequence in the memory unit except for the inclusion, where desired, of justification characters used for subsequent typesetting operations. The display is divided into a fixed header field and a text field. The display controller receives the memory addresses of the first characters of the header and text fields and a selected margin size. It retrieves the lines of text within each field from the memory unit and displays them within the selected margins. It calculates the memory address of the first character of each display line subsequent to the first line in that field. In addition, the display controller modifies the display appearance of any selected character to provide such features as black on white, blinking or underlined characters in response to appropriate coding data contained in each character word.

24 Claims, 10 Drawing Figures

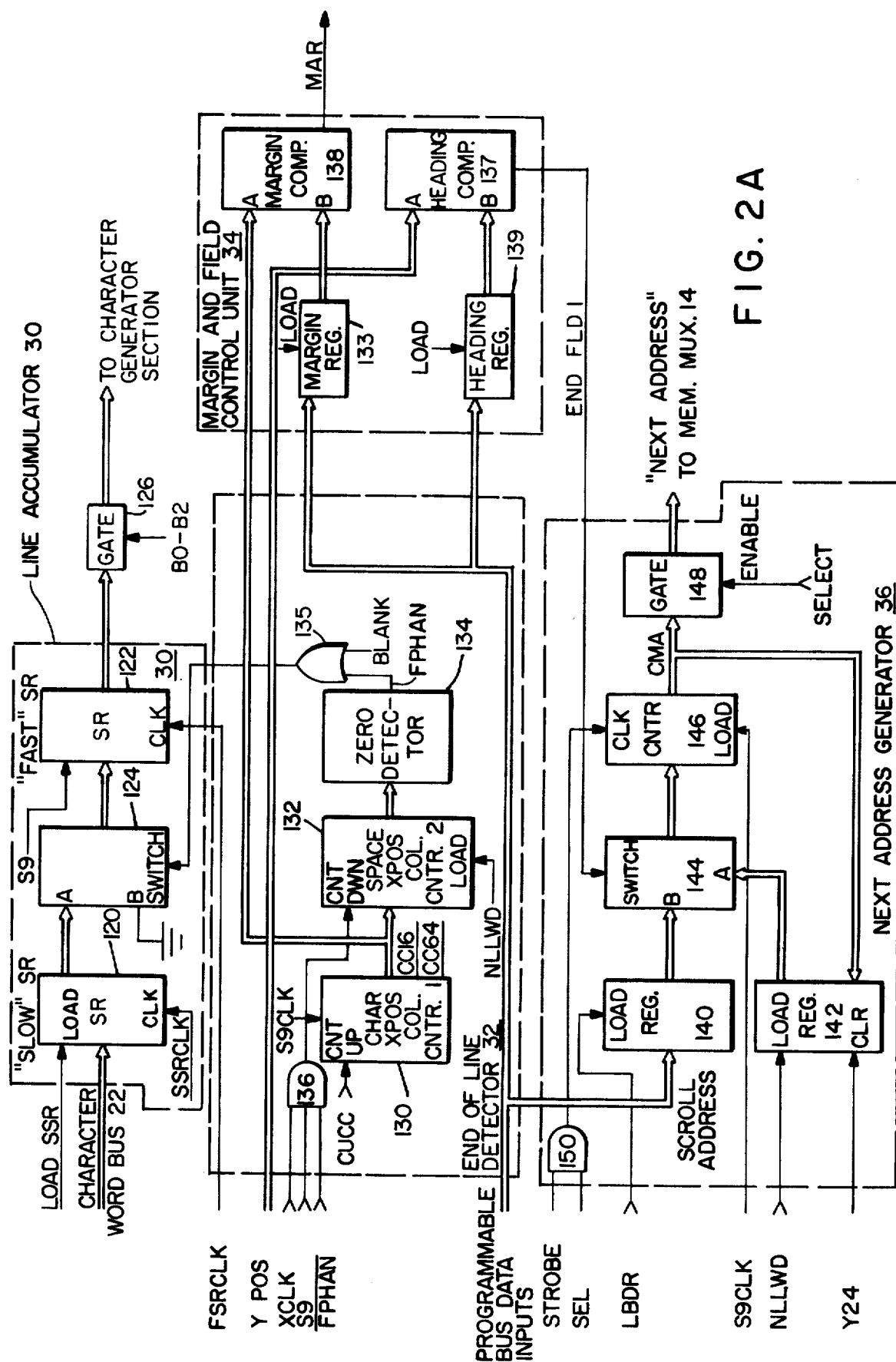

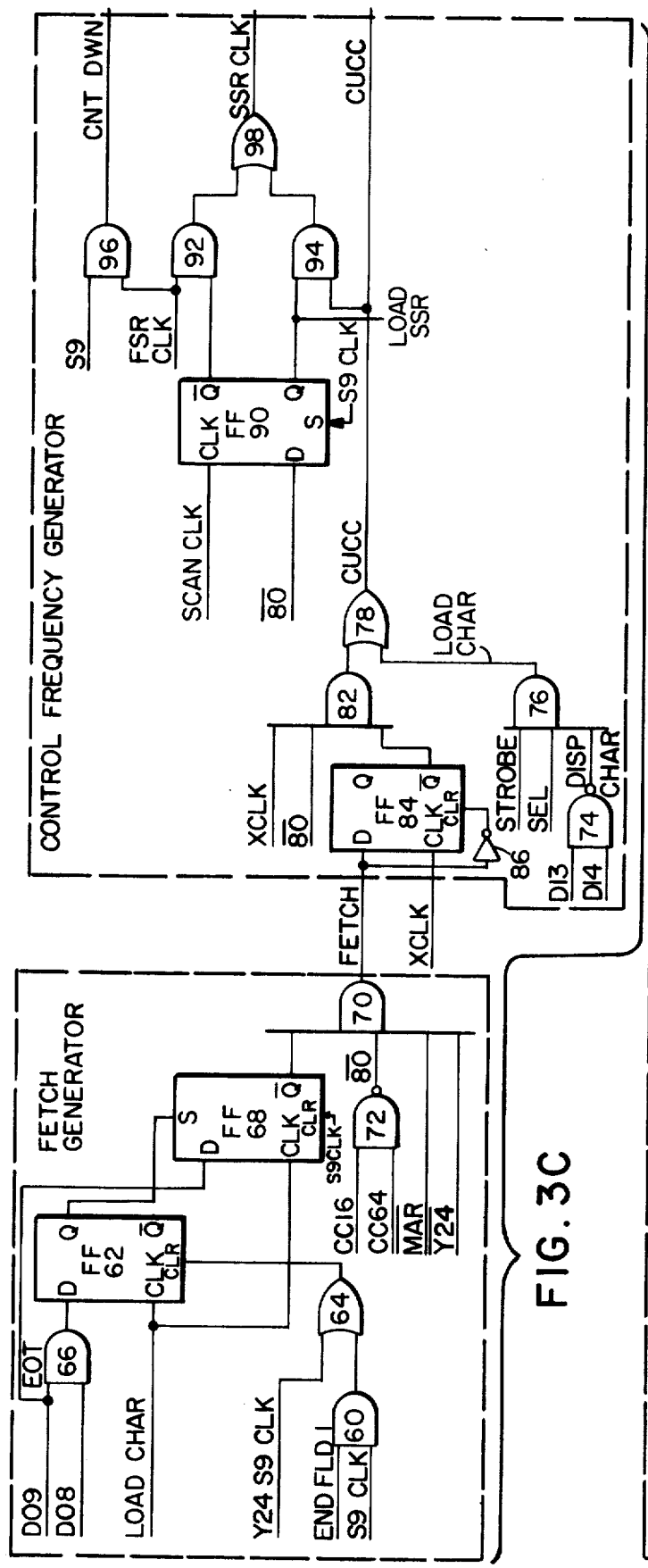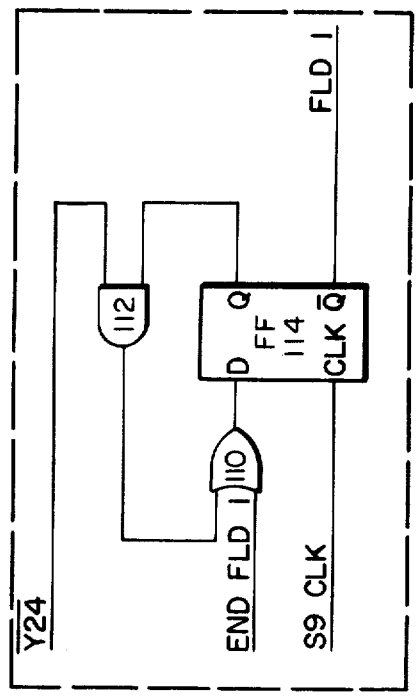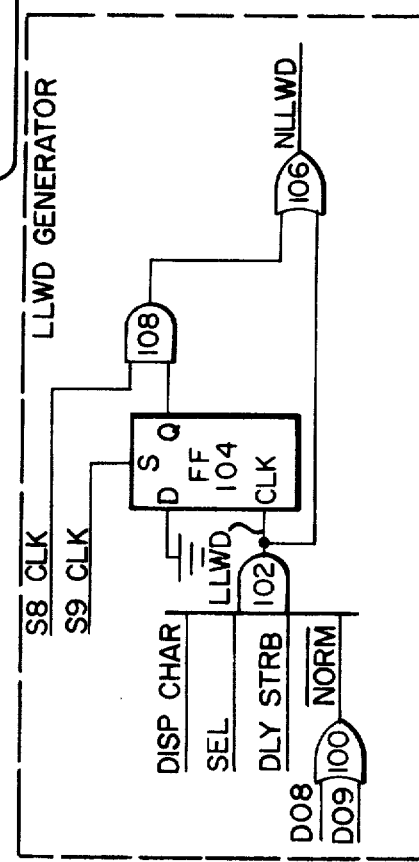
FIG. 3C
FIG. 3E
FIG. 3D

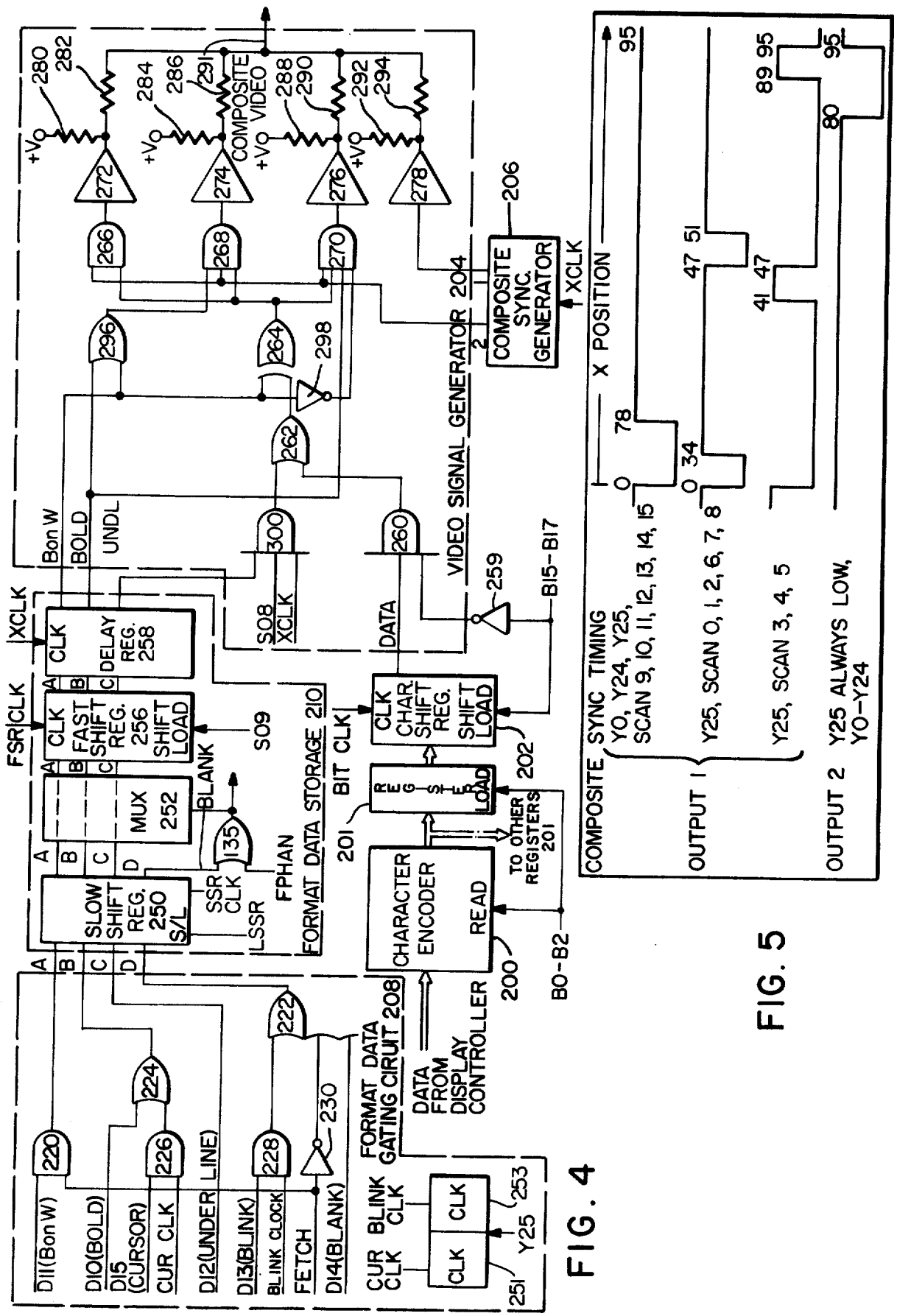

TEXT EDITING AND DISPLAY SYSTEM

CROSS REFERENCES TO RELATED APPLICATIONS

This is a continuation of Ser. No. 508,359, filed Sept. 23, 1974 (now abandoned).

Reference also is made to U.S. patent application Ser. No. 710,220 filed July 30, 1976 which is a continuation of Ser. No. 508,358 filed Sept. 23, 1974 (now abandoned).

BACKGROUND OF THE INVENTION

A. Field of the Invention

This invention relates to electronic text editing and display systems and, more particularly, to a system in which the characters to be displayed are "closepacked" in a memory. A display controller calculates the memory addresses of the characters, retrieves the characters from memory and determines the endings of successive lines of displayed text.

B. Prior Art

Electronic text editing and display systems commonly include a digital data processor for editing the textual data to be displayed. In some systems, the processor is included in a single unit with an input device such as a keyboard and an output device such as a display at which the text being edited is reviewed; each input and display thus have associated with them a corresponding processor. However, such systems are quite expensive because a processor is included with each display. In other systems the processor operates with two or more display units. This reduces the costs of such systems, but introduces other complications.

Typically, in either system, the editing functions are performed primarily in, and controlled by, the processor. This places a substantial burden on the processor and, in cases where the processor is shared by more than one display, limits the number of display units the processor can service without unduly degrading the display.

One of the editing functions performed by text editing systems is margin control, that is, the accomodation of the displayed text to a preset margin so that words are not improperly split by running over the margin. Typically this is accomplished with the aid of the processor which monitors each line being displayed and terminates the line upon arriving at a word that is too long for display without runover. Line termination is accomplished by inserting a line-delimiting code into the text, which is stored in a memory. When the display controller retrieves the stored text, it responds to the line-delimiting code by causing the display to shift down to the next line. Thus, each time an editing function is performed which may move text from one line to another, the processor must recalculate line-delimiter positions for each successive line. In some cases this can result in the recalculation of most or all of these positions and, correspondingly, a substantial amount of repositioning of the line delimiting codes in the memory. A large amount of processor time may be needed for the operations, so the processor can therefore handle only a few editing stations.

Accordingly, it is an object of this invention to provide an improved text editing and display system.

Further, it is an object of the invention to provide an improved text editing and display system in which the central processor can be shared among a relatively large number of displays.

Another object of the invention is to provide an improved multi-display text editing system including a central processor in which the display burden on the central processor is greatly relieved.

Still another object of the invention is to provide apparatus for controlling the display of text in an electronic text editing and display system.

SUMMARY OF THE INVENTION

In the present invention, we provide a display controller which performs many of the functions normally performed by the central processor in connection with displaying textual data.

Specifically, our display controller fetches a line of characters from memory, one character at a time, and stores these in a first shift register. As each character is loaded into this shift register, control bits associated with the character are examined to determine whether the character is a delimiter character (for example, whether the "character" is a space or a hyphen); if it is, both the position of the character in the shift register and the address of the character in memory are noted. When the first character that would cause a spillover beyond the right-hand margin is then loaded, the loading terminates. The display controller blanks the character positions in the line following the position of the last word-ending or word-break word (i.e., a delimiter character) prior to the spillover and initializes a memory address register with the noted address of the first character following this point so that the next display line begins with this character. The controller also responds to control bits associated with each character indicating whether the character must terminate a display line (e.g. end of paragraph) and, again, blanks out the remainder of the line on the display.

As these margin control operations are performed by the display controller, the display data stored in memory can be tightly "packed" that is, the characters are stored in the memory one after the other without any intervening "blank" characters. Thus, the memory is efficiently utilized. Moreover, the margin can be readily changed by setting a different number into a margin register which the controller uses in its line-ending operation described above.

This invention is pointed out with particularity in the appended claims. A more thorough understanding of the above and further objects and advantages of this invention may be attained by referring to the following detailed description taken in conjunction with the accompanying drawings.

BRIEF DESCRIPTION OF THE DRAWINGS

FIG. 2A is a block and line diagram of a preferred form of controller in accordance with the present invention;

FIGS. 3A through E are block and line diagrams, including circuit diagrams, of the various timing generators and control signal generators associated with the display controller;

FIG. 4 is a block and line diagram of the video display circuit in the present invention; and FIG. 5 is a timing diagram showing horizontal and vertical synchronizing signals used in the display.

DESCRIPTION OF AN ILLUSTRATIVE EMBODIMENT

Figure 1:
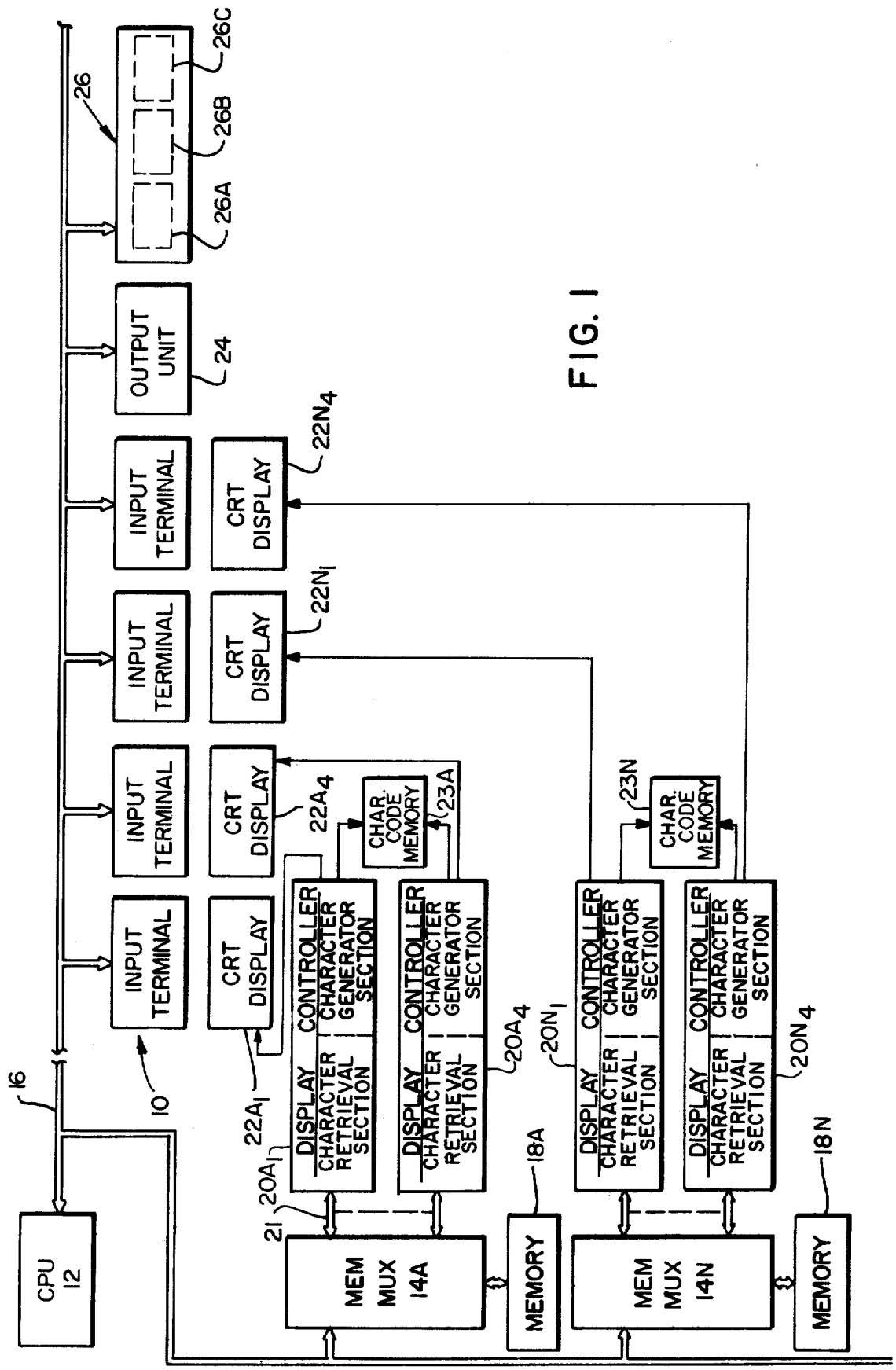
FIG. 1 is a block diagram of a text editing and display system incorporating the display controller of the present invention.

The operation of the display controller of the present invention will best be understood by first describing the system in which it is incorporated. In FIG. 1, a text editing and display system is formed from a number of input terminals 10, a central processor unit (CPU) 12, and a number of memory multiplexers 14, all of which are connected to a common bus 16. Each memory multiplexer 14 has associated with it a memory 18 and a number of display controllers 20 that drive corresponding CRT displays 22 thereby to produce an image of the data entered at input terminals 10. Each display controller 20 comprises a character retrieval section and a character generator section. A memory 23 is connected in common to all the display controllers associated with a given multiplexer and is shared among them to provide information that is necessary to display each character.

Generally a single input terminal 10 is associated with a single display unit 22 to form an editing "station". One or more output units 24 are connected to the bus 16 to receive the editing text from the CPU 12. A supervisory station 26 having a memory 26A, a display 26B, and controls 26C monitors the operations at the various editing stations. For compatability, each unit connected to the bus, including the memory multiplexers 14, has a control and status register (CSR) which stores control information required for communicating with the unit, as well as one more data registers (DR) which "buffer" or temporarily store the data being transferred to or from the unit. The registers, and thus the units themselves, are directly addressable by all other units connected to the bus as though they were memory locations, and thus data transfer with them is performed by normal memory reference instructions.

The input terminals 10 comprise conventional keyboards containing the usual alphabetic, numeric, and punctuation keys, as well as control keys which allow the editing of text which is to be displayed on the corresponding display units 22. The data from these input terminals 10 is applied to the bus 16, together with control bits designating the device to or from which data is being transferred and indicating the operation that is to take place, that is, a data reading or writing operation. As previously noted, the bus 16 is a bidirectional signal transfer device which allows data transfer between any two devices connected directly to it, provided these devices have appropriate bus interface units incorporated in them, as described in detail in U.S. Pat. No. 3,710,324. For present purposes, it suffices to consider the bus as being comprised of a number of separate lines that carry device address signals, control signals, and data signals. These lines are preferably all organized for parallel data transfer and thus there is one line for each address, data or control signal or bit.

The cnetral processor unit 12 performs the required editing in response to inputs from the keyboard. For example, in response to these inputs, it may add or delete characters, words or lines, may provide upper-case, lower case, italicized or other types of character displays or set up cursors to mark selected characters. In doing this, the central processor unit 12 communicates with the memories 18, as well as with the controllers 20, over the common bus. It also performs the usual "housekeeping" operations in the system, and may be available to perform functions wholly outside the text-editing and display system.

Advantageously, the central processor unit 12 comprises a central processor unit such as is used in a PDP11 data processing system manufactured by Digital Equipment Corporation. Such a central processor unit includes a bus controller which, among other functions, monitors bus operations, assigns use of the bus to various devices connected to it in accordance with their assigned priority levels, and interrupts usage of the bus by these devices when a device having a higher priority requests bus access. A more detailed description of the structure and operation of the common bus, and the characteristics of a central processor used with such a bus, is set forth in the previously identified U.S. Pat. No. 3,710,324.

The memory multiplexers 14 provide the connections between the common bus 16, on the one hand, and the memories 18 and display controllers 20 on the other, for purposes such as display data entry, editing, or storage, as the case may be, as well as between the memories 18 and the display controllers 20 for refreshing the displays. They are described in detail in copending U.S. patent application Ser. No. 508,358 filed Sept. 23, 1974 and entitled "Text Editing and Display System Having Grouped Displays". The memories 18 comprise random access memories such as magnetic core memories. They are shared by the display controllers 20, as well as by the central processor unit 12 and other devices connected to the common bus 16, and are directly addressable by these devices through the memory multiplexers 14. The data stored in these memories can be operated on in place by the processor during editing operations.

The display controllers 20 organize the data for display. Among other functions they periodically retrieve refresh-display data from their associated memories 18 and assemble this data in the desired format, a line at a time, for display. Each controller includes a character retrieval section for accumulating the characters to be displayed and adjusting them to a preset margin and a character generator section which generates the video signals required to display a character. The character generators associated with a given multiplexer each have access to a character code memory 23 which stores a dot pattern corresponding to a desired character and which is shared in common with the other character generator sections associated with that multiplexer.

The CRT displays 22 preferably comprise the display portions of conventional commercial television receivers, as these are available in large quantities at low cost. These displays have an interlaced scan of 525 lines per frame and a frame rate of 30 frames/second. In the present embodiment of the invention, the display may be considered to be divided into 25 character lines, each line 80 characters wide, including letters, numerals, punctuation and spaces. In addition, the display is divided into an upper Header Field which displays text heading information and a lower Text Field which displays the text to be reviewed and edited by the keyboard operator.

Turning now to FIG. 2A, the control section of one display controller is illustrated in detail. The character retrieval section comprises a line accumulator unit 30 which acts as a character register. It transfers character codes that it receives from memory 18 through an associated memory multiplexer 14 to the display means. More specifically the line accumulator receives the character codes in sequence and accumulates these characters in a shift register to form a display character line for application to the character generator section. An end of line detector 32 initiates the loading of blank characters into the line being formed in the line accumulator 30 after the last word in the line has been detected and prior to margin overrun. A margin and field control unit 34 stores data indicating the position of the right-hand margin (e.g., the width of the line) and Header Field length and provides control signals when these limits are reached. A next address generator 36 calculates the address of the next character code to be fetched from memory thereby to cause a retrieval of character codes from the memory.

Figure 2B:
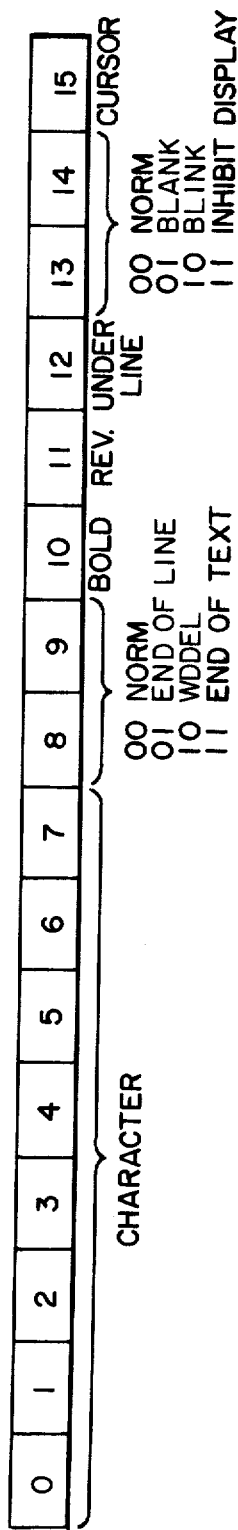
FIG. 2B is a sketch of a typical character word operated on by the controller of the present invention and showing the character bits and the control bits of the word.

Before describing each of these units in detail, it will be helpful to have an understanding of the format of a character word, or character code, as well as the various timing and control signals utilized in the display controller. The character word format is shown in FIG. 2B for a processing system having a 16-bit word capability. In the preferred embodiment of the invention, bits 0 through 7 are allocated to an identification of the character itself, thereby allowing designation of any one of 256 different characters. The next two bits (bits 8 and 9) designate the character type, that is, whether the character is a normal character (00), an end-of-line character designating the end of the display line (01), a word delimiter, such as a space, a hyphen, a comma (10), or an end-of-text character designating the end of the text (11). Bits 10, 11 and 12 designate whether the character is to be displayed in bold face, in reverse mode (black on white) or with an underline, respectively. Bits 13 and 14 designate the mode of display, that is, normal display (00); blank display (01); blinking display (10), or inhibit display (11). Finally, bit 15 designates whether or not the cursor is at that character location.

Figure 3A:
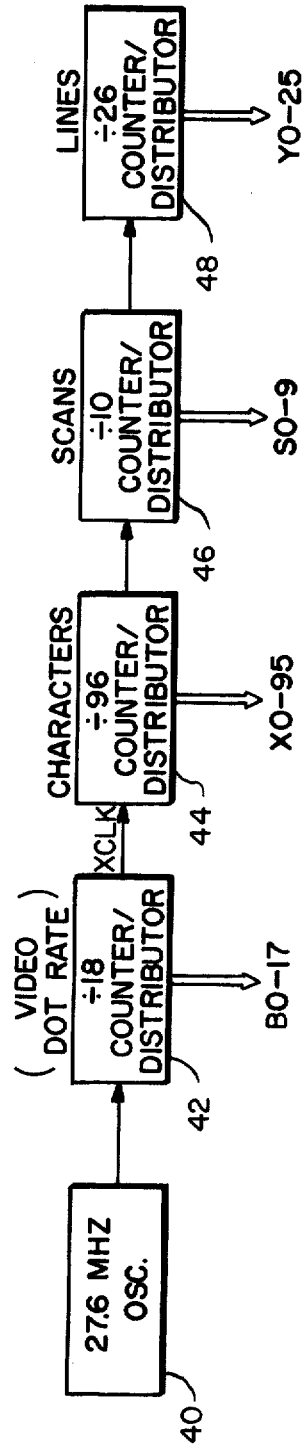
Figure 3B:
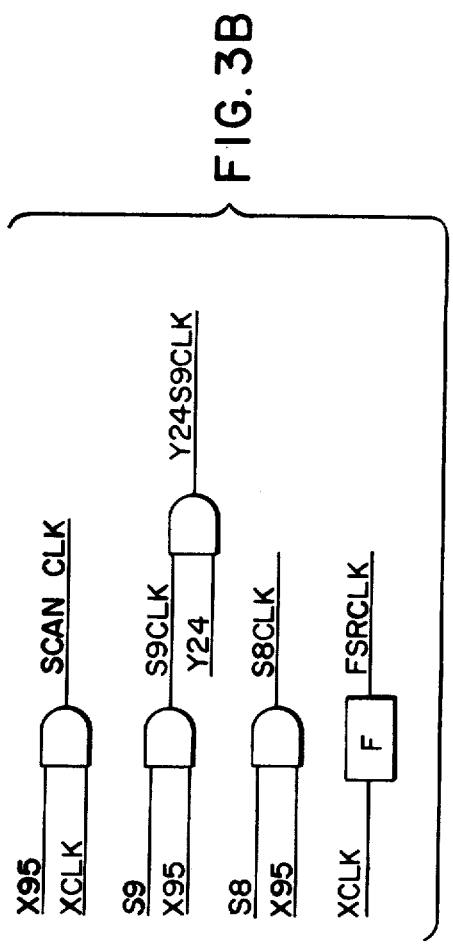

Turning now to FIG. 3A, the primary timing signals are obtained from a master clock 40 which operates at the rate 27.6 MHz (more precisely, 27.57888 MHz). The output of this clock is divided by a factor of 18 in a frequency divider 42 to provide the video dot rate for timing of the CRT display. The divider 42 provides outputs B0-17 to form 18 repetitive, equally spaced pulses at the video dot rate, to thereby mark each of the horizontal dot positions occupied by a single character. Character timing markers X0-95 are generated in a distributor (frequency divider) 44 which is driven by the last stage (lowest frequency) output of divider 42. The timing markers X0-95 designate the 96 horizontal ("X" co-ordinate) character times in a single display scan.

Each line of characters is formed by 10 equally spaced scans on the TV screen. The scanning rate is thus ten times the horizontal line rate and the scan timing pulses are thus obtained by dividing the output of character rate generator 44 by a factor of 10 in a scan line generator (frequency divider) 46. Generator 46 produces timing pulses S0 through S9 corresponding to the respective ones of the ten scan lines and, additionally, drives a line counter generator (frequency divider) 48 which divides the line scan frequency by a factor of 26 to obtain character line ("Y" co-ordinate) markers Y0 through Y25 corresponding to each of the 26 character lines, respectively, in the display.

In addition to the primary markers generated by the timing circuits of FIG. 3A, certain secondary timing markers are also utilized in the display control section of FIG. 2A. The generation of these secondary timing pulses is illustrated in FIGS. 3B through E. In particular, a SCAN CLK timing pulse which designates the end (character position 96) of a scan line is obtained by gating the X95 and XCLK timing pulses. Timing pulses designating the end of the ninth and tenth scan lines, respectively, are obtained by gating the X95 and the S8 and S9 timing pulses, respectively. Additionally, a Y24S9CLK timing pulse designating the end of the last scan of the last display line is obtained by gating the last scan line timing pulse Y24, with the S9CLK timing pulse. Finally, a fast shift register clock, FSRCLK, is obtained by filtering the XCLK clock rate 80 character pulses for each 96 X-pulses; the remaining 16 X-pulses are used for retrace.

Characters are supplied to a display controller from memory 18 (FIG. 1) in response to a FETCH signal from that controller. Thus, the FETCH signal in the controller is asserted when data is being sought from memory; if it is not asserted, data cannot currently be utilized by the display controller. Normally, data is being continually sought by the display controller for refreshing purposes, and thus the FETCH signal is normally asserted. However, the FETCH signal will not be asserted under any of the following conditions:

1. The line accumulator 30 in the display controller (FIG. 2A) has received more characters than can be accomodated within the margin that has been preset by the operator;

2. In the absence of a margin set by the operator, the line accumulator has received a number of characters that cause the word to run off the edge of the display screen (which is 80 characters wide, 16 character spaces being allowed for retrace);

3. The controller has received a character indicating that it marks the end of a line or the end of text.

On the occurrence of any of these conditions, the FETCH signal shifts to a non-asserted state. This is accomplished as shown in FIG. 3C. An AND gate 60 detects coincidence between an S9CLK signal (see FIG. 3B) designating the last character position of the tenth scan line of a given display line and an END FLD1 signal generated internally within the display control section of FIG. 2A and designating the presence of the display scan in the last line of the Header Field. The output of the AND gate 60 is applied to the clear input of a D-type flip-flop 62 via an OR gate 64; the Y24S9CLK signal designating the end of the Text Field (i.e., the last character position of the tenth scan line of line 25 of the scan) also clears the flip-flop 62. Thus, flip-flop 62 is cleared (that is, its $\overline{Q}$ output signal is asserted while its Q output signal is not asserted) whenever the display reaches the beginning of either the Header Field or the Text Field. On the other hand, flip-flop 68 is cleared at the end of the last scan of each line, thus enabling the display controller to resume fetching characters from memory.

AND gate 66 receives as its input ninth and tenth bits (D08 and D09, respectively) of the most recent character word received by the display controller, and sets the flip-flop 62 whenever both these bits are present to indicate that the character forms the end of the text to be displayed. Additionally, the tenth bit of the character word (D09) is applied as an input to the flip-flop 68. Flip-flop 68 has a preset (S) input connected to the Q output of flip-flop 62, and a clear (CLR) input to which an S9CLK signal (denoting occurrence of the last character bit of the tenth scan line) is applied. Flip-flops 62 and 68 are clocked by a LOAD CHAR ("load character") signal.

The inverting ($\bar{Q}$) output of flip-flop 68 is applied to an AND gate 70, together with the outputs from a NAND gate 72 and control signals indicating that: the margin preset by the operator has not yet been exceeded ($\overline{MAR}$) by the line of characters being assembled in the line accumulator 30 (FIG. 2A); that 80 characters (a full display line) have not been assembled in the line accumulator ($\overline{80}$) in response to CC16 and CC64 signals; and that the vertical retrace time of the display (line 26) has not yet been reached ($\overline{Y24}$). The CC16 and CC64 signals applied to the NAND gate 72 are generated by a column counter in the end-of-line detector (unit 32) of FIG. 2A which tracks the horizontal position of the lastest character accumulated in accumulator 30.

Summarizing the foregoing, the FETCH signal is generated as follows:

Flip-flop 62 is reset at the end of each field, while flip-flop 68 is reset at the end of each character line. So long as flip-flop 62 is reset, its Q output is not asserted so it does not set flip-flop 68. Thus, flip-flop 68 is reset and its $\bar{Q}$ output is asserted to enable the AND gate 70. Under these circumstances, so long as the margin set by the operator (MAR) and the absolute margin comprising the edge of the display (80) have not been exceeded and the last line of the display (Y24) has not been reached, the AND gate 70 generates the FETCH signal. Conversely, if the line of characters being assembled in the line accumulator 30 (FIG. 2A) were to cause the last word in the character line to run over the margin set by the operator or the edge of the display or if the last line of the display were reached, the AND gate 70 would be disabled and the FETCH signal would be terminated. Further, if the tenth bit in a character word (bit D09) is a ONE (i.e., designating an end-of-line or an end-of-text character), the flip-flop 68 is set at the next LOAD CHAR signal thereby disabling the AND gate 70 and terminating the FETCH signal for the rest of the line. Additionally, if bits D08 and D09 are both ONES, the AND gate 66 conditions the flip-flop 62 to be set when the next character is loaded. This in turn sets the flip-flop 68 via the overriding set input to that flip-flop thereby to disable the NAND gate 70 and terminate the FETCH signal for the rest of the field.

Flip-flop 68 is reset at the end of the current character line by the S9CLK pulse. Thus, if flip-flop 68 were set by the D09 bit only, indicating the end of a line of text, the FETCH signal is generated at the very next character time. If, however, flip-flop 68 were set as a consequence of the setting of flip-flop 62, it could not be reset until the flip-flop 62 reset, that is, until the display were to reach the end of the Header Field or the Text Field. Under these circumstances, the FETCH signal is not regenerated until reaching the end of the respective fields.

Still referring to FIG. 3C, certain load and transfer timing signals are also generated. In particular, a display character (DISP CHAR) signal is generated by means of a NAND gate 74 to which the D13 and D14 bits, respectively, of the current character word in the display controller are applied. If both of these bits are asserted, thereby indicating the inhibit display mode (see FIG. 2B), the output of the NAND gate 74 is at a non-asserted level. During any other mode, the signal from the NAND gate 74 indicates that that particular character is to be displayed. The output of the NAND gate 74 is applied to an AND gate 76 together with the STROBE and SEL (select) signals from the associated memory multiplexer 14 thereby to store the character in the display controller. The output of the AND gate 76 is the load character (LOAD CHAR) signal previously described as a clocking signal for flip-flops 62 and 68. The output of the AND gate 76 is one of two signals applied to an OR gate 78; the other input is the output of an AND gate 82 which has first and second normal input terminals to which an XCLK pulse and a $\overline{80}$ signal, respectively, are applied, and an inhibit terminal which receives the $\bar{Q}$ output of a D-type flip-flop 84. The FETCH signal is applied to the D input of flip-flop 84 and, after inversion in an inverter 86, is also applied to the clear input terminal of this flip-flop. The flip-flop 84 is clocked by the XCLK signal. As long as the FETCH signal is present, the flip-flop 84 is set and the AND gate 82 is disabled. When, however, the FETCH signal assumes a non-asserted level, the flip-flop 84 is cleared; so the AND gate 82 is enabled. Thus, the XCLK pulse passes through this gate as long as the scan has not reached the edge of the screen.

It should be noted that whenever the FETCH signal is not asserted, neither the SEL nor the STROBE signal will be asserted, since the latter are essentially responses to the former. The AND gate 76 will thus be de-energized when the AND gate 82 is energized, and vice-versa. The output of the AND gate 76 causes the loading of characters into the display controller at the STROBE rate while the output of the AND gate 82 controls the shifting of these characters at a fast rate within a temprorary storage register until all 80 positions in a first shift register are loaded. These alternative outputs are denoted CUCC (count up column counter).

As will be seen shortly, the line accumulator unit of the display control section utilizes two shift registers to assemble the characters that are to be displayed. The first of these, the slow shift register, essentially serves as a buffer between the second or fast shift register and memory 18. Further, the slow shift register accomodates the insertion of blanks necessary to implement the margin and "word-wrap around" features. Ultimately, all or part of the contents of the slow shift register are transferred to the fast shift register and the transfer takes place at a more rapid rate than the rate at which the characters are assembled in the slow shift register. The timing for this is attended to in FIG. 3C by means of a flip-flop 90, AND gates 92, 94 and 96, and an OR gate 98.

Flip-flop 90 is a D-type flip-flop which receives the $\overline{80}$ signal as an input signal and the SCANCLK signal as a clocking signal. It is set at the end of every tenth scan line by the S9CLK signal. So long as the scan line has not reached the edge of the display (i.e., when $\overline{80}$ is present), the flip-flop 90 remains set and enables an AND gate 94 to pass the CUCC timing signals through OR gate 98 as SSRCLK (Slow Shift Register Clock) pulses thereby to load character codes into the SR register 120 (FIG. 2A). Conversely, when the end of the display line has been reached, the $\overline{80}$ signal shifts to a non-asserted state. The flip-flop 90 resets when a next SCAN CLK pulse appears. The AND gate 94 is thus disabled while the AND gate 92 is enabled. Gate 92 then passes the FSRCLK (Fast Shift Register Clock) pulses to OR gate 98. This fast clock is used to shift the slow shift register 120 at the same rate as the shift register 122 to avoid data loss. The SSRCLK pulses from the OR gate 98 are applied to the line accumulator. Additionally, the FSRCLK signal is applied to the AND gate 98 together with the S9 (tenth scan) signal to generate a CNT DWN (count down) signal which is applied to the end-of-line detector unit 32 for use in connection with blank insertion in the character line as characters are transferred to the shift register 122 during the last scan of line of characters.

After the last word in a display line is received from memory and as the characters are being transferred to the shift register 122, positions that will not display a character are filled with blanks. These events are controlled by an NLLWD (new load last word delimiter) signal which is formed by a delimiter circuit in FIG. 3D by means of an OR gate 100 which receives the bits from character word bits D08 and D09, respectively, and produces a $\overline{NORM}$ signal whenever either bit position contains a ONE; that is, when the character is other than a normal display (see FIG. 2B). The output of OR gate 100 is applied to an AND gate 102 together with a DISP CHAR (display character) signal obtained from the NAND gate 74 (FIG. 3C) and SEL (select) and DLY STRB (delay strobe) signals from the associated memory multiplexer 14. Effectively, the output of the AND gate 102 indicates that a character is to be displayed but that the character is other than a normal character, that is, it is a word delimiter character, a line end character, or a text end character. The output of AND gate 102 is applied to a D-type flip-flop 104 as a clocking signal and to an OR gate 106. The Q output of flip-flop 104 enables an AND gate 108 to pass S8CLK (ninth scan clock) signals to OR gate 106. Flip-flop 104 is set by an S9CLK (tenth scan clock) signal. This sets the flip-flop at the end of every tenth scan.

At the beginning of the first scan line of each character line, flip-flop 104 is in the set state; it therefore enables the AND gate 108. As the scan continues, the next line of characters is being assembled in the register 120 in the line accumulator 30 (FIG. 2A). Normally, the last word delimiter signal will have been detected in the characters being accumulated by the time that the display scan has reached the end of the ninth scan, and the flip-flop 104 will thus have been reset by this last word delimiter signal to thereby disable the AND gate 108. However, if no such signal has been detected by the end of the ninth scan, the AND gate 108 remains enabled and the S8CLK pulses pass through it thereby to generate pseudo LLWD pulses, namely, NLLWD pulses. This terminates the accumulation of characters in the display controller and insures that a new line will be presented to the character generator at the time it is ready to begin its first scan.

Finally, FIG. 3E depicts the generation of the FLD1 signal which is used to disable the margin control during the display of the Header Field. An OR gate 110 receives an END FLD1 (end field 1 signal) from the margin and field control unit 34 (FIG. 2A), as well as a reset signal from an AND gate 112, and sets a flip-flop 114 when either of these signals is present. The AND gate 112 is enabled by the $\overline{Y24}$ output of the line counter 48 (FIG. 3A). Flip-flop 114 is clocked by an S9CLK signal. As long as the display has not reached the 25th display line, $\overline{Y24}$ is asserted so the AND gate 112 is enabled and flip-flop 114 is set. When, however, the last scan line is reached, the $\overline{Y24}$ signal shifts to a non-asserted level so the AND gate 112 is disabled and the flip-flop 114 is reset by the next S9CLK signal. When reset, the flip-flop 114 generates the FLD1 signal that constitutes a margin disable signal for the margin controller.

Returning now to FIG. 2A, the operation of the character retrieval section will now be more readily understood. In response to a FETCH signal from the timing unit of the display controller (FIG. 3C), the multiplexer 14 supplies character words, one at a time, to the display controller, together with STROBE and DLY STROBE signals for loading them into the controller. Bits 0 through 7 of the character word define the character, and these bits are applied in parallel to line accumulator 30 (FIG. 2A); bits 8 through 15 of the character word contain control information and these bits are applied to the timing unit (FIGS. 3A-3E) as already noted and to the character generator (FIG. 4).

Line accumulator 30 includes first and second shift registers 120 and 122, respectively, and a switch 124. The shift registers 120 and 122 are fast dynamic shift registers, and store eighty 8-bit character words, the bits of each word being stored in parallel; thus each register accommodates a full line of characters (80 characters). The registers are loaded, one word at a time in response to each clock pulse. During the presence of a LOAD SSR signal or the S9 signal, respectively the character words are advanced, one position at a time, on receipt of an SSRCLK and an FSRCLK pulse, respectively. The LOAD SSR signal persists until 80 characters have been received. In the absence of a corresponding one of the LOAD SSR and S9 signals, the registers recirculate the data contained in them.

Register 122 is loaded with characters through switch 124 as the last scan for a prior line of characters being displayed. Normally, switch 124 is set to connect register 122 to receive data from register 120. However, when switch 124 receives an FPHAN signal from the end of line detector 32, it connects the inputs of register 122 to ground, thereby loading blank character words into register 122 during each clock pulse supplied to that register. The purpose of this is to fill up the display line being accumulated in line accumulator 30 whenever one of the end-of-text or end-of-line control characters has been detected, or whenever the register 120 has transferred to register 122 the maximum number of words that can be accommodated within the margin established for that display or, if no margin has been set, within the display line.

The end-of-line detector 32 comprises first and second counters 130 and 132, respectively, a zero detector (comparator) 134, an OR gate 135, and an AND gate 136. Counter 130 tracks the number of characters loaded into the line accumulator 30; its contents are incremented by one of each CUCC pulse it receives at its count-up input terminal. The contents of this counter are applied to counter 132 and as well as to the margin and field control unit 34. Additionally, two of its outputs (CC16 and CC64) are made available to the FETCH signal generator (FIG. 3C).

The count in counter 130 is loaded into counter 132 on the occurrence of an NLLWD signal (FIG. 3D). The count in counter 132 is decremented each time an AND gate 136 is energized. When the AND gate 136 is enabled by $\overline{FPHAN}$ and the S9 signals, it passes XCLK signals through to counter 132. Zero detector 134 generates the FPHAN signal when the contents of counter 132 reach zero or when a "BLANK" signal is applied to the line accumulator 30, the BLANK signal being generated by the format circuit 210 (FIG. 4) whenever a particular character is not to be displayed.

Switch 144 of generator 36 receives the END FLD1 signal from unit 34. This signal is generated by a comparator 137 whenever the scan reaches the line whose number is stored in heading register 139 by the system operator.

The keyboard operator enters the desired margin width at his input terminal and this number is stored in the margin register 133 by the central processor whenever a command is generated. The FETCH signal from the controller then interrogates the multiplexer 14 and on receipt of the answering STROBE and SEL (select) signals, starts the count up counter clock (CUCC) which shifts characters into the register 120 (via the SSP CLK signals) and which simultaneously increments the count in counter 130 by one count for each character shifted into the register 120. For each word delimiter character, end-of-line character or end-of-text character encountered by the timing and control unit (FIG. 3D) of the display controller, and NLLWD signal is generated which thereupon loads the contents of counter 130 into counter 132. Thus, counter 132 contains the current line position of the most recent word delimiter, end-of-line character, or end-of-text character.

Counter 130 also continuously applies its count to the margin comparator 138, where it is compared with the preset margin count stored in register 133. When the count of counter 130 equals the margin width set in register 133, the comparator 138 generates a MAR signal to indicate that the margin has been reached. At this time, the counter 132 contains the address of the last word delimiter, end-of-line character or end-of-text character immediately preceding the margin. When the MAR signal is asserted, it disables the AND gate 70 (FIG. 3C) and thereby disables the FETCH signal. As long as the FETCH signal is disabled, no further STROBE or SEL signals can be received from the multiplexer 14 and the AND gate 76 is thus disabled. Further, the flip-flop 84 (FIG. 3C) is then reset, so that AND gate 82 is enabled. This causes the frequency of the CUCC pulses, and thus the SSR CLK pulses, to shift to the XCLK rate. This shifts the words through the register 120, one position at a time, in order to preserve them.

The FPHAN signal is not asserted during this time, so the AND gate 136 is not enabled until the beginning of the tenth (S9) scan line. At the start of that line, the AND gate 136 is enabled and passes XCLK pulses to the counter 132 to begin counting it down. Simultaneously, the SR register 122 is enabled to transfer characters through the multiplexer 124 to the register 122 as the characters which were being displayed are shifted during the tenth scan time. The transfer from register 120 to register 122 continues until the counter in register 132 goes to zero. At that time the zero detector 134 generates the FPHAN signal which switches the input of register 122 to ground and thereby loads blank characters into this register. This continues until 80 characters, including blanks, have been loaded.

Because the memory words are stored in memory without regard for the line on the display which they will ultimately be displayed, it is necessary that the display controller store or "remember" the location of the last character that is displayed in a line so that the next line can begin with the character immediately following the last character of the previous line. Further, in cases where the display is to be "scrolled", that is, moved upwardly or downwardly a line at a time, it is necessary that the controller be able to determine the addresses of the character words in memory which are to be presented to the display generator during scrolling while imposing a minimum burden on the central processor unit. This is all achieved by the "next address generator" 36.

Generator 36 is formed from storage registers 140 and 142 which are selectively connected through a switch 144 to a counter register 146; the contents of register 146 are incremented by one count on receipt of a signal from an AND gate 150 whenever the STROBE and SEL signals are asserted simultaneously thereby to generate a running list of addresses. Counter 140 receives from the central processor unit the address of the first character in memory which is to begin the display in the Text Field. This address is loaded into register 140 on receipt of a LBDR (Loan Begin Display Register) signal from the common bus.

Similarly, register 142 receives an address from counter register 146 and this address is loaded into the register 142 on receipt of an NLLWD (New Load Last Word Delimiter) signal from the timing generator (FIG. 3D). Register 142 is cleared during the scanning of the 25th line (Y24). The address contained in register 146 is applied through gate 148 to the memory multiplexer 14 to fetch a character from the memory 18 whenever a SELECT signal is applied to gate 148. Counter 146 is loaded with data presented to it by switch 144 on receipt of an S9CLK signal, that is, at the end of the last (tenth) scan of each character line.

During the time that the Header Field is being formed, the END FLD1 output of unit 34 is not asserted and switch 144 connects the output of register 142 to the input of counter register 146. Since the contents of register 142 are cleared at the time the last display line is reached (Y24), the counter register 146 is loaded with ZEROES at the end of the last scan of the entire display (that is, during both Y24 and S9CLK). The count in this counter then begins from zero and proceeds one count at a time in response to each output of gate 150; this indicates that a character is being loaded into a line accumulator 30. Since the first character in the heading is stored at memory address zero and successive characters are stored at successive locations in memory, the counter register 146 thus contains the address of the most recent character in the line accumulator 30.

After the line accumulator 30 is loaded with a character comprising a word delimiter, the contents of counter 146 are loaded back into register 142 which now points to the character after the word delimiter. Further, the appearance of a line delimiter or margin overflow condition causes the FETCH and thus the STROBE signals to cease and thus the contents of counter 146 are not advanced any further at this time. Each time a new FETCH signal is generated and an answering SELECT signal is received, gate 148 is enabled and the contents of the counter 146 are applied through the memory multiplexer 14 to the memory 18 to thereby initiate the retrival of the next character which is to begin the following display line. As each such character is entered into the line accumulator 30, gate 150 passes the STROBE signal from the multiplexer to advance the count in counter 146 by one count. The counter register 146 thus continues tracking the address of the most recent character applied to the display controller.

This operation is repeated throughout the entire assembly of the Header Field. When the end of this Field has been reached, the unit 34 supplies an END FLD1 signal to switch 144 to connect register 146 to register 142, instead of register 140. At the end of the last display line of the Header Field, the contents of register 142 thereby are loaded into counter register 146. Thus, when the FETCH signal for the following line initiates the generation of the corresponding select signal, gate 148 applies to the multiplexer 14 the address at which the Text Field display is to begin. Thereafter, the counter 146 increments this address by one for each character loaded into the line accumulator 30, and thus generates the addresses of all successive characters in the manner previously described in connection with the Header Field.

FIG. 4 shows the video signal control circuitry used in each controller 20 for generating a composite video signal which energizes the CRT scan. Each character encoder 23 is a memory that is addressed for each character by character bits 0–7 from the display controller 20 together with the scan line count from counter 30 (FIG. 3A). In response, it provides a string of bits defining the light and dark portions of the character in the scan line then being traversed by the CRT electron beam. This bit string is loaded into a register 201 and from there it is loaded into a character shift register 202. The serial output of register 202 is the data input to a video generator 204. Generator 204 proudces a video output signal which varies the CRT electron beam intensity in response to its data input. Signal generator 204 also receives a sync signal from sync generator 206 for properly synchronizing the scan of the CRT unit with the video signal.

Format data bits D10 through D15 in the character-identifying word are retrieved from each memory 18 and are inputs to a format data gating circuit 208 which gates those bits with various clocking signals to produce the appropriate format signals. A format storage section 210 includes registers for storing format information generated by gating circuit 208. The video signal generator 204 receives the format information from storage circuit 210, and in response, modifies the video signal to vary the appearance of the display characters.

More specifically, the bit counter 42 (FIG. 3A) provides a series of eighteen timing signals B$\phi$-B17 as the CRT beam sweeps across each character position on the screen. The scan line segments of each character are displayed during the corresponding intervals B$\phi$-B14. That is, the encoder 23 provides a string of fifteen bits for each character in each scan line and the shift register 202 feeds these bits to the signal generator 204 serially in response to the B$\phi$-B14 but signals. During the last three timing intervals B15-B17, the CRT beam traverses the horizontal space between characters and it is therefore blanked. The shift register 202 is quiescent during this interval.

During the interval B$\phi$-B17 that each of the CRT displays 22A is displaying the horizontal segments in each character scan line, the buffer register 201 in the associated character generator is loaded with a new bit string for the next character to be displayed.

Thus, during each display bit interval B$\phi$-B2, the gate 126 (FIG. 2A) in the controller 20A2 is enabled to apply the character in the output stage of the shift register 122 in that controller to the character encoder 23. The same B$\phi$-B2 signal enables the register 201 (FIG. 4) in the character generator section of controller 20A2 to receive the resulting bit string output from the encoder 23. During successive intervals, the registers 201 in the other controllers 20A are similarly loaded, the register 201 in the controller 20A4 being loaded during the interval B9-B12 with a bit string for the next character to be displayed by the CRT display 22A4.

Then, during the quiescent interval B15-B17, the contents of the registers 201 are loaded simultaneously into the shift registers 202 in the respective controllers 20A. Each register 202 is thus ready to begin feeding a bit string for the next character to its associated signal generator 204 during the immediately following B$\phi$-B14 interval.

The foregoing arrangement provides a significant advantage over prior systems using the conventional integrated-circuit raster scan character generators, which are necessarily more limited as to the variety of characters that can be generated. By time-sharing the programmable read-only memory used for the character encoder 23 among up to four displays, we provide a wide variety of characters with better definition, yet at no greater cost, even though the encoder 23 is basically more expensive than the integrated-circuit generators.

Display modes are controlled by the format data bits D10 through D15 of each character-defining word retrieved from memory. These bits are inputs to the format data gating circuit 208 and control the following functions when they are set:

Bit D10 increases the intensity of the displayed character for bold-faced print;

Bit D11 inverts the display so that the printing is black and white;

Bit D12 underlines the displayed character;

Bit D13 causes the display character to blink to emphasize it in the SELECT operation described below;

Bit D14 blanks its associated character, i.e. prevents display thereof (e.g. half-or quarter space characters which are inserted by the processor into the memory 18 during a justification routine);

Bit D15 indicates that the character is the cursor character, i.e. the cursor is to be displayed with that character.

Still referring to gating circuit 208, the FETCH signal (from FIG. 3C) is an enabling input to AND gate 220 and is an input to inverter 230 whose output is an input to OR circuit 222. The D10 data bit is passed by OR circuit 224 whose output is a "B" data input to a slow-shift register 250 corresponding to the slow shift register 120 (FIG. 2A). The D11 data bit is a second input to AND gate 220, whose output is an "A" data input to register 250. The D15 bit and the CUR CLK output of the cursor clock 251 are inputs to an AND gate 226 whose output is also passed by OR circuit 224. The D12 bit is a direct input to the "C" input terminal of register 250. The D13 bit and the BLINK CLK output of a blink clock 253 are inputs to an AND gate 228 whose output is an input to OR circuit 222. And finally, the D14 bit is a third input to OR circuit 222. The output of OR circuit 222 is a "D" data input to register 250.

Register 250 is an eighty-position register which contains the format data corresponding to each character to be displayed. The SSR CLK signal is a clock input to register 250 and the LSSR signal enables the loading of data into, or alternatively the shifting of data through, the register 250. Thus, format data is carried in register 250 synchronously with the character identification data stored in register 120 (FIG. 2A).

The A – C outputs of register 250 are three inputs to a multiplexer 252 whose outputs in turn are inputs to a fast shift register 256. The D output of register 250 is one input to an OR circuit 135 whose output is applied to the multiplexer 252 to blank the outputs of that multiplexer. The other input to OR circuit 135 is the FPHAN signal. The register 256 is an eighty-position shift register corresponding to the fast shift register 122 (FIG. 2A). Normally, i.e. without a load command input, the register 256 circulates data in response to its clock input. Upon receiving a load signal, register 256 loads data present at its A-C input terminals. It then shifts it toward its A-C output terminals each time it receives an FSSR clock signal. Register 256 receives the FSR CLK as its clock input and the SO9 signal as its load command and thus operates in synchronism with the character shift register 122 (FIG. 2A). The A output of register 256 is a "B on W" signal which controls display image reversal; the B output is a BOLD signal which, when asserted, increases the intensity of the displayed character; the C output is an UNDL signal which, when asserted adds an underline to the displayed character. The outputs of register 256 are applied to a shift register delay 258 which is a two stage shift register whose output corresponds to its input delayed by one XCLK time period. This delays the format control signals by the same interval that the associated character signals are delayed in the register 201.

When a character is to be displayed without any variations in the format, the output from register 202 provides the only data input to the video signal generator 204. This input is applied to an AND gate 260. The second input to AND gate 260 is the $\overline{B15\text{-}17}$ signal from inverter 259. Gate 260 is normally enabled and its output is one input to OR circuit 262 whose output passes through an exclusive OR circuit 264. Normally, the second input to the exclusive OR circuit 264 is not present, so it passes its data input to AND gates 266, 268, and 270, respectively. The output of amplifier 272 is connected to the junction of registers 280 ad 282; the output of amplifier 274, to the junction of resistors 284 and 286; and the output of amplifier 276, to the junction of resistors 288 and 290. The other terminal of each of resistors 280, 284 and 288 is connected to a positive voltage source and the other terminal of each of resistors 282, 286 and 290 is connected to a composite video output terminal 291.

The outputs of amplifiers 272 through 276 are summed at composite video output terminal 291. The composite video signal comprises four levels of intensity. When all four amplifiers are off, the composite signal is below the black level. Energizing amplifiers 272 through 276 controls the intensity of the CRT display according to the number of amplifiers energized. Amplifier 278 is normally on during character display and, by itself, produces a composite video signal at the black level. Thus, the output "1" of generator 206 terminates to provide SYNC signals to the CRT display.

Amplifier 272 is energized by ONES in the data bit strings from register 202 and in response provides a video signal level which energizes the CRT display to a "normal" viewing intensity. Amplifiers 272 and 274 are energized for black on white display to increase the "white" character background and thereby improve the readability of the display. Finally, amplifiers 272 through 276 are jointly energized to provide a third, and more brilliant, display level for bold face characters. Output 2 of sync generator 206 terminates to blank the display during retrace and off-screen portions of the horizontal CRT lines.

Accordingly, the B on W output of register 258 is an input to an OR circuit 296 whose output is one input of gate 268. The B on W signal is also an input to exclusive OR circuit 264 and to an inverter 298 whose output is one input to AND gate 270. The BOLD output of register 258 is a second input to OR circuit 296 and also an input to AND gate 270. The UNDL output of register 258 is an input to an AND gate 300 whose other inputs are the SO8 and XCLK signals. The output of AND gate 300 is an input to OR circuit 262.

Still referring to FIG. 4, a B15-17 signal is applied to the AND gate 260 by way of an inverter 259 to disable the AND gate 260 and thereby blank the output of video generator 204 during the horizontal interval between successive characters.

The B on W output of register 258 enables AND gate 268 to increase the power output of the video signal and also causes exclusive OR circuit 264 to invert the data sigal, thereby causing the text to appear as black on white. The BOLD output of register 256 enables all three amplifiers 272–276 to energize each time a data bit is present thereby increasing the intensity of the display. And finally, the UNDL output of register 258 causes a full row of horizontal character segments to be entered onto the screen during the ninth scan line of the character, thereby underlining that character.

In the inhibit display mentioned above, in connection with FIG. 3C, both the D13 and D14 bits are ONE's. The output of gate 74 thus disables gate 76 and thereby blocks the CUCC signal. It thereby prevents entry of the associate character word into the line accumulator 30 and also prevents the line position counter from being incremented. Therefore, the ensuing display includes neither the inhibited character nor a blank character in its place. This feature is particularly advantageous for storing control "characters" within the text for use in justifying a printed copy thereof (e.g., half and quarter space characters which are useful for a composition machine but not for a CRT display having fixed intervals for characters and spaces) while providing an uninterrupted display of the text on the CRT screen.

The keyboard operator can perform a number of editing operations in the text displayed on the CRT screen associated with his keyboard, these operations including those conventionally performed in electronic editing systems as well as several novel operations that assist materially in the writing and editing of textual material. The editing operations performed by a typical system incorporating the present invention are as follows:

TYPE OVER — This is the normal mode of entry of characters from the keyboard 10. A character transmitted from the keyboard is entered into the slot denoted by the cursor. The character replaces any other characters that was previously in the denoted slot. The cursor moves on to the next character slot to make ready for the next character from the keyboard.

INSERT — The system moves the cursor character and all succeeding characters downwardly so as to leave a space immediately upward from the cursor character. We use "up" and "down" as indicating relative position along a string of text. Thus "down" means to the right in the displayed text and, if the end of a line is reached, to the beginning of the next line. Text to be inserted is entered into that space. The inserted text can be one or more characters transmitted in succession from the keyboard or it can be a word or other selected portion of the text retrieved from the memory 18.

DELETE — The cursor character is deleted to leave an empty space and the succeeding characters in the text are moved upwardly so as to eliminate that space. An entire word or other selected portion of the text can also be deleted in a single operation described below.

RUB OUT — The character immediately upwards from the cursor is removed.

Additionally, the system can perform the following auxiliary operations:

CURSOR MOVEMENT — In response to actuation of one of four appropriately marked keys on the keyboard 10, the system will move the cursor one slot up or down, or straight, up or down one line in the display.

FIELD SELECTION—The operator can select any desired word or group of words on the CRT screen, with the system responding by causing the selected field to blink as described above. In a typical embodiment of the invention the keyboard has a "select word" key which the operator actuates to select a word designated by the cursor character therein. An operator-defined field can be selected by first positioning the cursor at one end of the field and depressing a "define" key and then moving the cursor to the other end of the field and again depressing the "define" key. The copy, delete and move operations can then be performed with the selected field instead of a single character by actuating the appropriate action keys i.e. "copy", "delete" and "move".

MOVE—The selected field is deleted in its present location and inserted immediately ahead of the location of the cursor.

COPY—The selected field is repeated in an insert operation immediately ahead of the cursor location.

CANCEL SELECTION—By pressing the "cancel selection" key the operator terminates the blinking of the previously selected field.

SCROLL—The keyboard 10 has "scroll up" and "scroll down" buttons which, when actuated, cause the displayed text to move down and up, respectively. Thus, when the operator actuates the "scroll up" key, additional lines of text appear at the top of the display text and correspondingly lines of text move down and disappear off the bottom of the screen.

The various editing functions can be performed either directly by appropriately connected circuitry or in response to a program controlling the operation of the central processor unit 12. A combination of these hardware and software arrangements can also be used as described below. Since algorithms of the editing operations are well known, it would be superfluous to detail them here. However, the following discussion will clarify their application to the system described herein.

First it will be helpful to consider some of the contents of the memory space associated with each of the displays. Each display has assigned to it for the storage of displayed text substantially more locations in the memory 18 than the number of characters than can be displayed on the screen. Typically, the number of memory locations assigned to a display might be twice the number of characters that can be displayed at one time. This facilitates the scrolling operation, since it permits the display controller to move up and down within the assigned block of memory locations for the retrieval of characters to be displayed on the screen.

Additionally, a set of memory locations assigned to each display contains the margin setting, the first memory address of the text being displayed, the number of lines in the header, the cursor address and the display line number containing the cursor. Depending on the algorithms used for the various editing operations, these locations may also contain such information as the first address in memory of the block assigned for text and the address of the last text character stored in memory.

For several reasons, it is desirable that a memory 18 (or other similar memory) also contain information concerning the beginnings of lines of text contained therein, both displayed and undisplayed. For example, if the keyboard operator commands a scroll-down operation, the next preceding line in the text must be added to the top of the screen. Even though the beginning address of the first displayed line (first address of displayed text) is stored, this is not sufficient to determine the memory address of the beginning of the next preceding line, since that ordinarily depends on the content of the second preceding line, and so on.

One might program the system to then compute the address of the next preceding line by starting at the beginning of the text and proceeding line-by-line through the text. However, we prefer to use an arrangement that uses less processor time.

Specifically the system stores in a table in memory the beginning addresses of all the displayed text lines contained in the memory, down to the line containing the cursor, these addresses being locatable by means of the text line numbers. In the non-displayed text, from the beginning of the text down to the first address of the displayed text, the line beginnings are indicated by setting the cursor bit of the first character in each line. Then, when a scroll-down is commanded, the central processor unit 12 can scan upward in memory, beginning from the address of the first displayed character, until it finds a character in which the cursor bit is set. The address of that character is then loaded into the first address register so as that the display will then commence with the line beginning with that character. The cursor bit in that character is then cleared. The reverse procedure takes place when the display is scrolled up, except that the processor then replaces the "first address" with the beginning address of the second line of the display. This can be accomplished by moving each line-beginning address up one position in the table in memory to make them correspond again to the display line numbers (or, equivalently, appropriately indexing pointers to those addresses).

A similar situation occurs when the system is commanded to move the cursor up or down one line. In order to do this, it must have the beginning memory address of the line presently containing the cursor, as well as the beginning address of the line to which the cursor is to be moved. For example, if the cursor is to be shifted up one line, the system must determine its position along the present line and then move it to the same position along the preceding line. This requires the memory 18 addresses of the beginnings of both lines. These addresses can be retrieved from memory by use of the cursor line number, which is also stored in memory, as noted above.

Since the system can readily compute the beginning addresses of text lines following the line containing the cursor, there is no need to store these addresses. That is, whenever the cursor moves down to the next line of text, for example, the beginning address of that line is computed and stored for later use as described above.

Instead of storing all the line-beginning addresses of displayed lines down to the line containing the cursor, the system may, for example, store only the first address as noted above, and the addresses of the first characters in the line containing the cursor and the preceding line. The first addresses of lines between the first displayed line and the line preceding the cursor can then be computed as needed.

In some prior systems, line delimiters are interspersed in the text stored in memory to indicate to the display the points at which successive display lines begin. When the beginning addresses of lines are required for various operations such as scrolling and cursor movement, the system finds them by "scanning" for the line delimiters. The stored line-beginning addresses in the present system can be used in the same manner as the addresses previously ascertained by means of line delimiters in the prior systems.

Because the present invention omits the use of line delimiters except at paragraph endings and the like, the display controllers 20 must include circuitry for repeatedly computing line-beginning addresses. However, the advantages derived from this arrangement far outweigh the increased complexity of the controllers. For example, the usual editing operations INSERT, DELETE, and TYPE OVER will ordinarily cause text to shift from one line to the next, sometimes all the way down to the end of the text. If line delimiters are used throughout, the processor must recompute their positions and rearrange them each time this occurs. Because of the time required for this task, a single processor can then handle only a few editing stations.

In the present system, on the other hand, the processor will ordinarily not have to engage in these computations, since the display controllers automatically adjust to the text position changes resulting from editing. As a result, a single processor can take care of a fairly large number of editing stations.

Most of the header is software-protected against change by the keyboard operator. There is, however, a command field in the header into which various commands can be entered. For example, this field is used to call up selected files for display and editing, to initiate print-out of text, to initiate justification of text for output to a photocomposition terminal and to reset the right-hand margin.

To operate in the header, the keyboard operator actuates a "header" key. Editing operations then take place in positions designated by a second cursor located in the header. When a command has thus been "typed" ine, the operator actuates an "execute" key and the system then executes the command. To return to the text, the operator actuates a "text" key.

CONCLUSION

From the foregoing, it will be seen that we have provided an improved editing and display system. By utilizing a display controller associated with each display to perform such functions as display line assembly including margin control, format control, and other such operations, we greatly relieve the burden normally imposed on the central processor by such operations; this enables a substantially greater number of display units to be connected to the central processor unit. Further, the display controller enables the use of a closely packed memory without burdening the central processor unit. This results in more efficient memory utilization and, therefore, lowers the system cost.

The display controller also greatly facilitates certain operations normally performed during editing, for example, scrolling the display upwardly or downwardly for review of the text being edited. In particular the display controller calculates the memory address of the remaining characters in a display line once it is provided with the address of the first character of that line. This again minimizes the involvement of the central processor unit in the scrolling operation and leads to substantial saving of processor time.

It will be clear to those skilled in the art that various changes may be made from the foregoing without departing from either the spirit or the scope of the invention and it is intended that such changes be encompassed herein, the scope of the invention being defined with particularity in the attached claims.

What we claim as new and desire to secure by Letters Patent of the United States is:

1. A unit for displaying characters including predetermined delimiter characters on a plurality of lines, said unit comprising:
    A. memory means for storing character codes in a plurality of addressable storage locations, the character codes representing the characters to be displayed, each character code designating whether it represents a delimiter character;
    B. display means for displaying characters at a predetermined number of consecutive display positions along a given line in a predetermined timing sequence in response to the character codes;
    C. timing means connected to said display means for establishing the predetermined timing sequence;
    D. transfer means connected to said memory means, said display means and said timing means for transferring the character codes from said memory means to said display means;
    E. address generator means connected to said timing means and said memory means for applying addresses to said memory means thereby to cause a retrieval of character codes from said memory means in a sequence corresponding to the consecutive display positions
    F. delimiter means connected to said transfer means and responsive to the retrieval of character codes from said memory means for indicating the transfer of a character code representing a delimiter character from said memory means,
    G. address recording means connected to said delimiter means and said address generator means for recording the storage location address from said address generator means when said transfer means receives the character code representing the last delimiter character that is to be displayed on a line, and
    H. address transfer means connected to said address recording means and said address generator means for transferring the contents of said address recording means to said address generator means as an updated character code address for the first character in a succeeding line of characters; and
    I. control means connected to said transfer means and said delimiter means for inhibiting the transfer from said transfer means to said display means of character codes succeeding the character code representing the last delimiter character for the given line.

2. A unit as recited in claim 1 wherein said address generator means includes counter means for generating address signals in sequence, said address transfer means being connected to said counter means for presetting said counter means with the value in said address recording means.

3. A unit as recited in claim 2 wherein said control means comprises:
   i. position means connected to said timing means for generating position signals that designate the display position of each character along its display line,
   ii. margin register means containing a number indicating a selected maximum line length and thereby defining a line-ending margin position, and
   iii. comparison means connected to said transfer means, said margin register means and said position means for inhibiting the transfer means when the position signals correspond to the number in said margin register means.

4. A unit as recited in claim 3 wherein said transfer means comprises first shift register means connected to said memory means for receiving the character codes in sequence from locations in said memory means identified by said counter means and second shift register means connected to said first shift register means and said display means for receiving the character codes from said first shift register means, said address transfer means being active during transfers from said memory means to said first shift register means.

5. A unit as recited in claim 3 wherein said display means displays the plural lines of text in each of two fields, a first field constituting a control field having a predetermined number of lines and the second field constituting a text field, wherein said timing means comprises means for generating line signals corresponding to the number of lines that are being displayed and wherein:
   I. said control means additionally comprises:
      iv. field register means for storing a number corresponding to the number of lines in the first field, and
      v. comparison means connected to said timing means and said field register means for generating a field comparison line signal when the line signals correspond to the number in said field register means, and said unit additionally includes:
   J. first location register means connected to said address transfer means for storing the address of the first character to be displayed in the second field, said address transfer means comprising switch means connected to said first location recording means, said address register means and said counter means for controlling the transfer to said counter means from said first location register means and said address recording means in response to the field comparison line signal.

6. A unit for displaying characters including predetermined delimiter characters, said display comprising:
   A. display means for displaying characters at a predetermined number of consecutive display positions along a given line in a predetermined timing sequence in response to the receipt of character codes;
   B. memory means for storing the character codes in a plurality of addressable storage locations, the character codes representing the characters to be displayed on a line, each character code designating whether it represents a delimiter character;
   C. timing means connected to said display means for establishing the predetermined timing sequence;
   D. transfer means connected to said memory means, said display means and said timing means for transferring the character codes from said memory means to said display means;
   E. delimiter means connected to said transfer means and responsive to the retrieval of character codes from said memory means for indicating the transfer of a character code representing a delimiter character from said memory means;
   F. detector means connected to said timing means for indicating when a character would be displayed at a display position beyond the predetermined number of display positions after the beginning of the given line;
   G. delimiter position recording means connected to said delimiter means and said timing means for recording the display position for each successive delimiter character that is to be displayed on the given line;
   H. control means connected to said delimiter position recording means, said detector means and said transfer means for enabling said transfer means to transfer to said display means character codes corresponding only to the characters to be displayed through a display position defined by said delimiter position recording means; and
   I. address generator means connected to said memory means and said timing means for generating address signals that are applied to said memory means for identifying the storage locations in a sequence corresponding to the consecutive display positions thereby to cause a retrieval of the character codes from said memory means.

7. A unit as recited in claim 6 wherein said detector means comprises
   a first counter means connected to said timing means for recording the number of characters in said transfer means to be displayed on a line, and said delimiter position recording means includes storage means connected to said first counter means and said delimiter means and responsive to the transfer of each delimiter character to said transfer means for storing a number representing the display position of that delimiter character.

8. A unit as recited in claim 7 wherein said detector means comprises:
   a. margin register means containing a number indicating a selected maximum line length that defines a line-ending margin position, and
   b. comparison means connected to said margin register means and said first counter means for generating the margin signal for said control means when the number in said first counter means corresponding to the number in said margin register means.

9. A unit as recited in claim 8 wherein said storage means in said detector means comprises second counter means connected to said first counter means and said timing means, said timing means altering the number in said second counter means and said control means generating an inhibit signal when said second counter means contains a predetermined number, the inhibit signal inhibiting the transfer of succeeding character codes by said transfer means to said display means.

10. A unit as recited in claim 7 wherein:
    D. said transfer means includes:

i. first register means connected to said memory means, ii. second register means connected to said display means, and iii. switch means connected to said first and second register means for coupling to said register means either the contents of said first register means or a code that represents a blank display, and G. said storage means in said delimiter position recording means comprises a second counter means connected to said first counter means and to said delimiter means that is preset to the display position recorded in said first counter means each time said first register means receives a character code for a delimiter character from said memory means, said second counter means being decremented as the character codes are transferred from said first register means to said second register means, said control means being connected to said second counter means and responsive to a value of zero in said second counter means for shifting said switch means from a state wherein said switch means couples character codes from said first register means to a state wherein said switching means couples the blanking codes to said second register means.

11. A unit as recited in claim 7 wherein said delimiter means comprises decoding means connected to said transfer means for decoding the delimiter character information in the character codes and control signal generator means connected to said decoding means and said storage means for generating a control signal in response to a delimiter character that causes the transfer of the number in said first counter means to said storage means.

12. A unit for displaying groups of characters on a plurality of lines wherein each character group is defined by a delimiter character and each character is defined by a character code, said unit comprising:

A. display means for displaying the character groups in a predetermined timing sequence at a predetermined number of display positions along a given line;

B. memory means for storing the character codes representing the characters to be displayed in addressable storage locations;

C. timing means connected to said display means for establishing the predetermined timing sequence;

D. transfer means connected to said memory means, said display means and said timing means for transferring the character codes from said memory means to said display means;

E. delimiter means connected to said transfer means and responsive to the retrieval of character codes from said memory means for indicating the transfer of a character code representing a delimiter character from said memory means;

F. margin means connected to said timing means for generating a margin signal when a character would be displayed in a display position beyond the predetermined number of display positions in the given line;

G. address generating means connected to said timing means and said memory means for applying to said memory means storage location addresses in a sequence corresponding to the consecutive display positions;

H. address recording means connected to said address generator means and said delimiter means for recording the storage location address for each delimiter character to be displayed on the given line;

I. display position recording means connected to said margin means and said delimiter means for recording the display position for each successive delimiter character to be displayed on the given line;

J. address transfer means connected to said address recording means, said address generator means and said timing means for setting said address generating means to the last recorded address in said address recording means thereby to set a starting address for a first character to be displayed at the beginning of a line of characters following the given line; and K. control means connected to said transfer means, said margin means and said display position recording means and responsive to the margin signal and signals from said display position recording means for inhibiting the transfer from said transfer means to said display means of any character codes representing characters to be displayed beyond a display position determined by the last recorded delimiter character.

13. A unit as defined in claim 12 wherein said transfer means includes a character register connected to said memory means for storing the succession of characters from said memory means and wherein:

F. said margin means includes:
i. margin register means for storing the predetermined number that establishes the number of display positions on the given line,
ii. a character counter connected to said timing means and said margin register means that counts the character codes retrieved from said memory means,
iii. comparison means connected to said margin register means and said character counter for indicating an equality when said margin register means and said character counter are equal, and I. said display position recording means includes a position recording register means connected to said delimiter means, said comparison means and said character counter for storing the contents of said character counter each time said delimiter means indicates the retrieval of a delimiter character from said memory means until said comparison means indicates equality whereby said position recording register means records the position of the last delimiter character for the given line, said control means being connected to said position recording register means to cause said transfer means to inhibit the display of characters corresponding to the character codes in said first register following the last delimiter character.

14. A unit as defined in claim 13 wherein a group of lines that appear to be displayed simultaneously by said display means constitute a frame of text and wherein said address generating means includes
a running address generator and means connecting said running address generator to said memory means, said unit additionally comprising a first display register connected to said address transfer means, said address transfer means loading the contents of said first display register into said running address generator prior to the beginning of each display frame whereby said display means repeatedly displays a string of characters beginning with the characters corresponding to the character codes stored in said memory means at the address indicated by said first display register.

15. A unit as defined in claim 13 wherein said unit additionally comprises a character generator connected to said transfer means and said display means and responsive to the character codes from said transfer means for generating signals to said display means for controlling the display of the characters and said character register comprises a shift register that receives and shifts therein the characters received from said memory means, D. said transfer means additionally including
  ii. a second shift register connected to said character generator that holds a line of characters corresponding to the characters to be displayed and supplies them serially to said character generator; and
  iii. means connected to said first and second shift registers and to said control means for coupling the characters in said first shift register into said second shift register, said control means being connected to said position recording register means and said coupling means for blanking from said second shift register the character codes representing characters following the last delimiter character.

16. A unit as defined in claim 12 wherein a group of lines that appear to be displayed simultaneously by said display means constitute a frame of text and wherein said address generating means includes a running address generator connected to said address transfer means and means connecting said running address generator to said memory means, said unit additionally including a first display register connected to said address transfer means, said address transfer means loading the contents of said first display register into said running address generator prior to the beginning of each display frame whereby said display means repeatedly displays a string of characters beginning with the characters corresponding to the characters stored in said memory means at the address indicated by said first display register.

17. A unit as defined in claim 12 additionally including a character generator connected to said transfer means and said display means that receives each character code from said display means for controlling the display of the corresponding character, D. said transfer means including:
  i. a first shift register connected to said memory means for storing the succession of characters from said memory means,
  ii. a second shift register connected to said character generator that holds character codes corresponding to a line of characters to be displayed and supplies them serially to said character generator,
  iii. switchable coupling means connecting said first and second shift registers for coupling the characters in said first shift register into said second shift register, said control means being connected to said switchable coupling means and responsive to the last delimiter character in the given line being transferred to said second shift register for blanking the transfer to said second shift register of the character codes following said last delimiter character position.

18. A text-editing and display system for displaying lines of characters, said system comprising:
  A. a processor for performing editing operations in response to editing commands;
  B. a memory unit connected for data transfer with said processor for storing character codes defining characters to be displayed and word delimiters, at least some of which are also characters, said processor performing editing operations on the character codes stored in said memory, the character codes corresponding to successively displayed characters being stored in said memory unit for retrieval in sequence, and
  C. a display unit comprising:
    i. a display device for displaying frames of text formed of lines of displayed characters in a predetermined timing sequence, and
    ii. a display controller connecting said memory unit and said display device, said display controller including:
      a. timing means connected to said display device for establishing the predetermined timing sequence,
      b. running-address register means connected to said memory means and said timing means for addressing said memory unit to retrieve the character codes therefrom in sequence,
      c. a character register means connected to said memory unit and said timing means for receiving and holding the succession of character codes retrieved from said memory unit,
      d. display causing means connected to said character register and to said display unit and responsive to the contents of said character register for causing the display of a corresponding line of successive characters at said display device,
      e. a margin register connected to said processor for storing a number indicating a selected maximum line length and thereby defining a line-ending margin position,
      f. position recording means connected to said timing means for recording the position, along said line, of the last word delimiter to be displayed in the line of characters,
      g. inhibiting means connected to said position recording means and said display causing means and responsive to the recorded position along said line of the last word delimiter for inhibiting the display of the characters that succeed the last word delimiter, and
      h. means connected to said timing means and said running address generator means and operable after the beginning of each display frame for setting said running-address register means to the memory address of the next character code for use in the retrieval of character codes for the next line of characters to be displayed.

19. A text-editing display system as defined in claim 18 wherein said position recording means includes a character counter connected to said timing means that counts the character codes retrieved from said memory unit, a position register connected to said character counter and means connected to said character register, said position register and said margin register for loading said position register with the contents of said character counter whenever a word delimiter-defining code is retrieved from said memory until the count in said character counter equals the content of said margin register whereby said position register records the number of characters from the beginning of the display line to the last word delimiter-defining code, said inhibiting means being connected to said position register and said display causing means to cause said display causing means to inhibit the display of characters corresponding to the character codes in said character register following last word delimiter.

20. A text-editing and display system as defined in claim 19 in which said display controller additionally includes:

j. a first-text-address register connected to and settable by said processor, and k. means connected to said first-text-address register and said running address register means for loading the contents of said first-text-address register into said running address register means prior to the beginning of each display frame, whereby said display device repeatedly displays a string of characters beginning with the characters corresponding to the character codes stored in said memory unit at the address indicated by said first-text-address register.

21. A text-editing and display system as defined in claim 19 additionally including a character generator for each character to be displayed for providing signals that enable said display device to display the character and wherein said display causing means includes:

1. shift register means connected to said character generator that holds a line of character codes corresponding to text characters to be displayed and supplies them serially to said character generator, and 2. coupling means connecting said character register and said shift register means for shifting the character codes in said character register into said shift register means, said coupling means being responsive to the content of said position register for blanking the character codes coupled into said shift register means for the characters following the last word delimiter.

22. A text-editing and display system as defined in claim 18 in which said controller additionally includes:

j. a first-text-address register connected to and settable by said processor, and k. means connected to said first-text-address register and said running address register means for loading the contents of said first-text-address register into said running address register means prior to the beginning of each display frame, whereby said display device repeatedly displays a string of characters beginning with the characters corresponding to the character codes stored in said memory unit at the address indicated by said first-text-address register.

23. A text-editing and display system defined in claim 18 in which said setting means includes:

1. a line-beginning address register connected to said timing means, 2. means connected to said character register for loading the contents of said running-address register means into said line-beginning address register in response to each word delimiter-defining character code retrieved from said memory unit, and 3. means connected to said timing means, said line-beginning address register, said character counter, said margin register and said running address register means for loading the contents of said line-beginning address register means into said running-address register in response to the count in said character counter equalling the content of said margin register.

24. The system defined in claim 18 including a character generator that receives the character code for each character to be displayed and provides signals to said display device for enabling said display device to display that character and wherein said display causing means comprises:

1. shift register means connected to said character generator that holds character codes corresponding to a line of characters to be displayed and supplies them serially to said character generator, and 2. coupling means connecting said character register and said shift register means for shifting the character codes in said character register into said shift register, said coupling means being responsive to said position recording means for blanking the character codes coupled into said shift register means for the characters following the last word delimiter.

* * * * *